Feb. 13, 1940.　　　　W. K. SIMPSON　　　　2,190,197
ADJUSTABLY VENTED AIR VALVE
Filed March 18, 1936
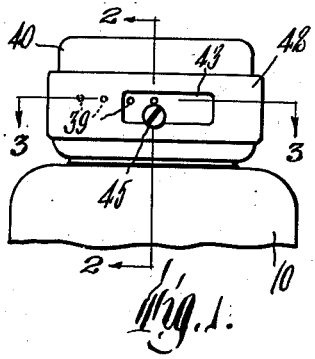
Fig. 1.
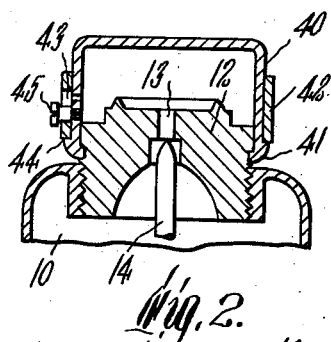
Fig. 2.
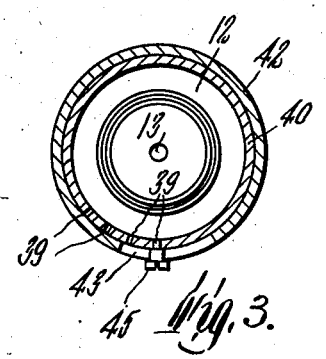
Fig. 3.
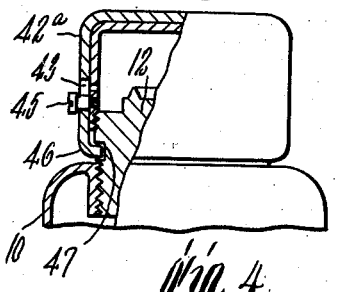
Fig. 4.
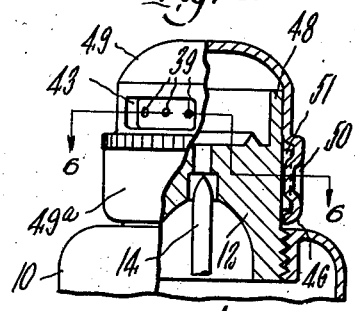
Fig. 5.
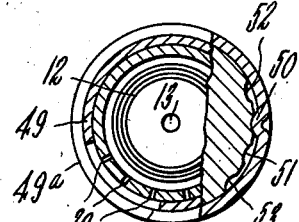
Fig. 6.
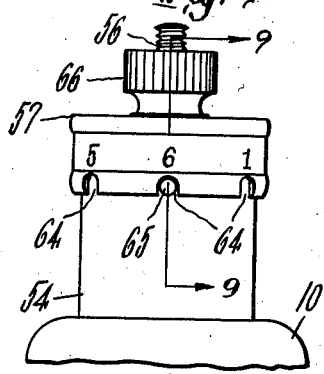
Fig. 7.
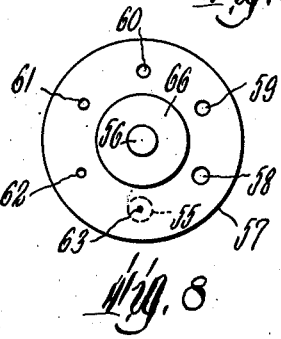
Fig. 8.
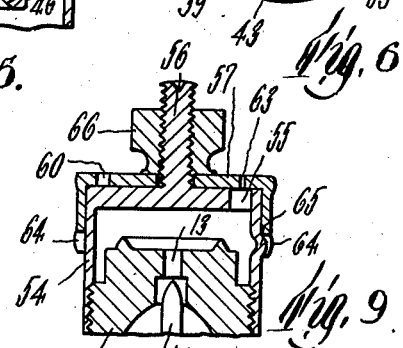
Fig. 9.
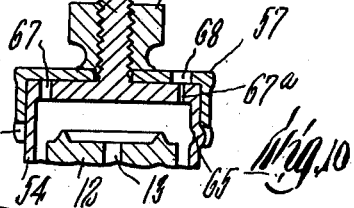
Fig. 10.
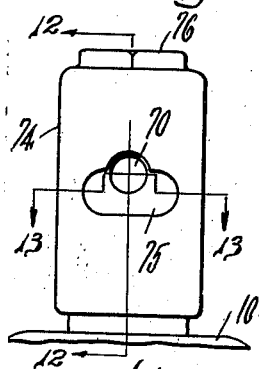
Fig. 11.
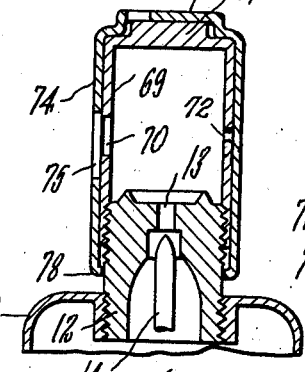
Fig. 12.
Fig. 13.
Inventor
William K. Simpson
by Wright, Brown, Quinby & May
attys.

Patented Feb. 13, 1940

2,190,197

UNITED STATES PATENT OFFICE 2,190,197

ADJUSTABLY VENTED AIR VALVE

William K. Simpson, Waterbury, Conn., assignor to Hoffman Specialty Company, Waterbury, Conn., a corporation of Illinois Application March 18, 1936, Serial No. 69,510

2 Claims. (Cl. 137—122)

This invention relates to air valves for use with steam radiators, the mains of steam heating systems, and any other analogous situations in which necessity may arise to release air from the radiators and piping of the system while preventing escape of steam and release of water. Its object is to provide as a part or adjunct of valves of this type, adjustable means whereby the rate of discharge of the air, and the pressure needed for expelling the air, may be adjusted and regulated.

Such regulation is important and necessary to effect control of the steam distribution among the various radiators connected in a one pipe steam heating system, (that is, a system in which steam is conducted to the radiators and condensate returned to the boiler in counter-current flow through the same pipes), as explained in my companion application entitled Heat control with one pipe heating system, Serial No. 69,511 filed concurrently herewith. The regulating means disclosed herein is one of the equivalent alternatives described or referred to in said application for controlling steam distribution. However, the scope of the invention claimed herein is not limited to use with such system only.

The invention consist in all novel characteristics and equivalents of the specific means hereinafter described and illustrated in the drawing, for controlling the escape of air and adjusting the rate of discharge and the pressure or time needed to expel it.

In the drawing,

Fig. 1 is a side elevation of the venting end of a radiator vent valve containing one form of means for varying the effective outlet area from the valve;

Figs. 2 and 3 are sections taken respectively on line 2—2 and line 3—3 of Fig. 1;

Fig. 4 is in part a side elevation and in part a vertical section of another form of outlet adjuster;

Fig. 5 is a view similar to Fig. 4 of still another form of outlet adjuster;

Fig. 6 is a cross section on line 6—6 of Fig. 5;

Fig. 7 is a side elevation of an outlet adjuster comprising a cap having a series of ports of different diameters adjustable into register separately with a single port;

Fig. 8 is a plan view of the device shown in Fig. 7;

Fig. 9 is a section on line 9—9 of Fig. 7; and

Fig. 10 is a view similar to Fig. 9 but showing the adjustable cap in a different position and a reversal of the port arrangement.

Figs. 11, 12 and 13 are similar views of a further variation; Figs. 12 and 13 being sections taken on lines 12—12 and 13—13 respectively of Fig. 11.

Like reference characters designate the same parts wherever they occur in all the figures.

The underlying principle of the present invention comprises means applied in series with the vent port of an air valve to vary the effective area of an ultimate outlet port. Such means may be combined with thermostat-controlled and float controlled valves of different constructions and designs. That chosen for illustration here, to which I have applied commercial embodiments of the invention, is a valve of the type disclosed in the patents of George D. Hoffman 1,211,314, January 2, 1917, and 1,708,622, April 9, 1929.

Such valve includes a casing 10 having a nipple protruding from the side of its base adapted to be screwed into a steam radiator. A plug fitting 12 secured in the upper end of the casing has a passage with an outlet port 13 adapted to discharge the air; such port being controlled by a valve 14 projecting from the upper end of a float, which is also a thermostat.

In the drawing the upper end of the casing and valve are shown; the float, its support and the nipple by which the valve casing may be secured to a radiator being omitted. Attention is directed to the above named Hoffman patent for disclosure of the standard valve parts not shown herein.

The outlet port 13 is of sufficient area to permit venting of the radiator at whatever rate may be determined as the desirable maximum. Means are provided to vary the rate of venting from such maximum to various slower rates. The form of such means shown in Figs. 1–3 consists of a shell 40 of inverted cup formation applied and secured non-rotatably to the vent plug 12 so as to envelop the vent port and an adjacent space, and a valve or shutter made as a sleeve 42 surrounding the shell with a rotative fit. There is a series of ports 39 in the zone of the shell which is surrounded by the shutter 42, which ports may be all of the same area, small enough to restrict venting to the slowest desired rate when only one port is uncovered, or of graduated areas. A single port 43 is formed in the shutter, wide enough circumferentially to uncover all of the ports 39, and placeable by rotation of the shutter to occlude all but one of the latter ports or to uncover two or more of them. The shell is secured by offsetting its rim 41 into a groove in the side of the vent plug. The shutter is guided by a shoulder 44 on the exterior of the shell, against which it is held by a screw or pin 45 set into the side of the shell and protruding through slot 43 beside the edge thereof nearest to the guiding edge of the sleeve.

The structure illustrated in Fig. 4 differs from that shown in Figs. 1 and 2 in that the shell 40 is screwed to the vent fitting, and the equivalent of the shutter sleeve 42 is a cap 42a which completely envelops the shell and the edge 46 of which is turned inward into a groove 47 surrounding the plug, in which it is free to slide.

Figs. 5 and 6 show a variation in which the ports 39 are formed in an upstanding flange 48 which is integral with the fitting 12. The shutter or valve here is a cap 49 like the cap 42a except that the zone in which port 43 is formed is of smaller diameter than the zone 49a which surrounds and is interlocked by its flange 46 with the main part of the fitting. At one point in the zone 49a the wall of the cup is intended to form a nib 50 to enter notches 51 in the adjacent side of the fitting. These notches are just deep enough to retard rotation of the shutter, and the part of the shutter in which the nib is formed has sufficient elasticity and resilience to permit the nib to pass over the high points between notches and to snap into the notches as the shutter is turned. There are as many notches as ports, and with the same angular spacing. Thereby the shutter may be locked in any position to uncover one or more of the ports at the same time; and by counting the snaps of the nib while turning the shutter from one extreme position toward the other, the operator can tell without looking how many ports are occluded or opened. The boundaries of both outermost notches from shoulders 52 and 53 are arranged to prevent traverse of the nib past them.

The arrangement shown in Figs. 7–9 comprises a shell 54 screwed to the end fitting and having a single port 55 in its end wall, and a screw threaded pivot stud 56 on which is mounted a cap 57 having an end wall abutting against the end wall of the shell, and provided with a series of ports 58—63 inclusive adapted to be placed singly in register with port 55. The rim of the cap 57 embraces shell 54 and has open notches 64 in its edge equal in number to the ports 58—63 and adapted severally to embrace a stud or offset nib 65 protruding from the side of shell 54 when any one of the ports in the cap registered with the single port in the shell. Said cap constitutes a shutter containing ports in its area adjacent to the pivot and provided with locking means (notches 64) at its edge to cooperate with complemental locking means on the shell. A thumb nut 66 is screwed on the pivot stud 56, normally holding the cap in one of its locked positions. This nut must be partially unscrewed to permit adjustment of the cap, which is then effected by moving the cap endwise clear of the lock stud and turning it. The end of screw 56 is countersunk and expanded and at such a distance from nut 66 that, while it permits sufficient travel to the nut to allow disengagement of 64 from 65, it does not permit the nut to be removed unless great force is exerted. Graduations and numbers may be applied on the outside of the cap flange adjacent to the notches 64 to indicate, with reference to a suitable index (which may be the locking stud itself) which one of the outlet ports registers at any time with the opening 55 in the shell.

The construction shown in Fig. 10 provides a series of ports 67, 67a and others, corresponding to 58—63, of graduated sizes in the end wall of shell 54, in circular arrangement around the stud 56, and the end wall of the shutter or cap 57 has a single port 68 adapted to be placed in register with any one of the series of ports exclusively. Otherwise this construction is the same as that of Figs. 7–9.

In the modification of Figs. 11, 12 and 13 a cylindrical shell 69 is secured to the fitting 12 so as to embrace the end thereof and the vent port 13, and has a series of ports 70, 71, 72, 73 of graduated diameters in the same plane perpendicular to the axis of the shell and equally spaced around the circumference. A valve sleeve or cylindrical shutter 74 surrounds the shell with a close sliding fit and has a single port 75 adapted to be placed in register with any of the ports 70—73 by rotation of the sleeve. An offset 76 in the end wall of the sleeve, and a stud 77 on the end wall of the shell serve to lock the sleeve in any one of its positions of registry with the several ports; such offset and stud being polygonal with the same number of sides as the number of ports and having an interlocking fit one within the other. The sleeve may be raised sufficiently to clear the offset from the stud preparatory to making an adjustment, but is prevented from removal by a flange 78 inturned from its rib and underlying the lower extremity of the shell.

In all cases the adjustment of the shutter valve to close all of the ports except the one of smallest diameter causes the greatest resistance to escape of air in venting the radiator and thus retards in the greatest measure filling of the radiator with steam. And other adjustments, to uncover a larger port or a greater number of ports, diminish the resistance to escape of air and the rate of heating the radiator in general proportion to the increased area of the outlet passage or passages thus afforded. In proportion to the number of outlet ports provided and to their various areas, the adjustments between different rates of air discharge may be made more or less fine. In some of the illustrations given here I have shown four ports, and in others six. This illustrates the fact that the number and the gradations of area from one to another may be varied, but is not intended to set the limits of variation in these particulars. Neither is the illustration of a specific design of air valve an indication of any significance as limiting the uses and applications of the new features of the invention. On the contrary, these features may be combined with any type of air vent valve in any circumstances where regulation of the rate of air discharge from a radiator or other part of a steam heating system may be useful.

What I claim and desire to secure by Letters Patent is:

1. A valve comprising a shell structure having an end wall and cylindrical side walls enclosing an internal space and a passage communicating with such space, a screw threaded stud projecting outward from said end wall, a shutter fitted to rotate pivotally on said stud in contact with the exterior of said end wall, and a nut threaded on the stud so as to be operable for pressing the shutter against the end wall and permitting separation of the shutter from said wall, said shutter having a rim surrounding the side walls of the shell and provided with notches in its edge, and the shell having in its side a locking projection located to be received in different ones of said notches when the shutter is turned to different angular positions around the stud and is in contact with the said end wall; one of the members constituted by said end wall and shutter having a vent port, and the other member having a series of ports spaced around the stud at the same center distance therefrom as the before named port and of different cross sectional areas, some of which are smaller than the first named port, and said ports being positioned relatively to the before named locking element and notches to effect registry between said first named port and different ports of said series when different notches are engaged with the locking element.

2. A valve comprising a cylindrical shell structure having an open interior and a ported end wall, a screw threaded stud projecting outward from said end wall, a complemental shutter fitted to rotate on said stud and formed to enclose the ported end of said shell in close contact therewith, the end face of said shutter having a series of ports of different sizes concentrically arranged about its center for selective registry with the port in the end wall of the shell, the rim of the shutter surrounding the end of the cylindrical shell being provided with notches in its edge and the side of the cylinder having a projection cooperating with said notches to lock said shutter positively in adjusted position with a selected port in the shutter in registry with the port in the shell, and a nut for said threaded stud whereby the shutter can be pressed against the ported wall of the shell and the notch corresponding to the selected port positively held in engagement with the projection whereby the shutter is prevented from being rotated.

WILLIAM K. SIMPSON.